United States Patent [19]

Wassen et al.

[11] Patent Number: 4,471,095

[45] Date of Patent: Sep. 11, 1984

[54] PROCESS FOR TRANSFERRING HEAT FROM FLUID MIXTURES CONTAINING A POLYMERIZABLE MONOMER AND AN ACTIVE POLYMERIZATION CATALYST, PROCESS FOR THE POLYMERIZATION OF A POLYMERIZABLE MONOMER AND INSTALLATION FOR POLYMERIZATION REACTIONS

[75] Inventors: Willem J. Wassen, Schinnen; Johannes P. Schuren, Beek, both of Netherlands

[73] Assignee: Stamicarbon B.V., Geleen, Netherlands

[21] Appl. No.: 347,478

[22] Filed: Feb. 10, 1982

[30] Foreign Application Priority Data

Feb. 11, 1981 [NL] Netherlands ..................... 8100643

[51] Int. Cl.$^3$ ............................................. C08F 2/00
[52] U.S. Cl. ...................................... 526/65; 526/88
[58] Field of Search ................................ 526/64, 65, 88

[56] References Cited

U.S. PATENT DOCUMENTS

| | | | |
|---|---|---|---|
| 2,984,657 | 5/1961 | Grundmann | 526/67 |
| 4,012,573 | 3/1977 | Trieschmann | 526/88 |
| 4,328,186 | 5/1982 | Karam | 526/64 |
| 4,332,924 | 6/1982 | Karam | 526/64 |

OTHER PUBLICATIONS

Spiral Heat Exchangers, Alfa-Lavel Co., (1973).

*Primary Examiner*—Paul R. Michl
*Attorney, Agent, or Firm*—Cushman, Darby & Cushman

[57] ABSTRACT

Polymerization process providing for the transferring of heat from fluid reaction mixtures containing a polymerizable monomer and an active polymerization catalyst by preparing a prepolymerization mixture and then cooling the prepolymerization mixture using a planar spiral heat exchanger before further processing of the prepolymerization mixture or the polymer product contained therein. An apparatus for conducting polymerization reactions wherein fluid mixtures having a polymerizable monomer and an active polymerization catalyst are cooled without clogging comprising a spiral heat exchanger.

15 Claims, 1 Drawing Figure

PROCESS FOR TRANSFERRING HEAT FROM FLUID MIXTURES CONTAINING A POLYMERIZABLE MONOMER AND AN ACTIVE POLYMERIZATION CATALYST, PROCESS FOR THE POLYMERIZATION OF A POLYMERIZABLE MONOMER AND INSTALLATION FOR POLYMERIZATION REACTIONS

BACKGROUND OF THE INVENTION

The invention relates to a process for transferring heat from fluid mixtures containing a polymerizable monomer and an active polymerization catalyst.

The invention also relates to a process for the polymerization of a polymerizable monomer in live polymer dispersions and to an installation for conducting polymerization reactions involving the cooling of live polymer dispersions.

In particular, the invention relates to the transfer of heat from mixtures contained from suspension-polymerization of alkenes containing monomer and active catalyst particles.

It is already known and usual to transfer reaction heat from the live polymer dispersion formed during the polymerization of a monomer such as, for example, a 1-alkene. For instance, this may be done by cooling by heat-exchange through the reactor wall, by evaporating the excess or unreacted monomer and/or by employing a dispersing agent. However, the amount of heat which can reasonably and economically be transferred is limited since the heat exchange area of the reactor wall and surface area for monomer evaporation are limited and increasing these areas is achieved only at almost prohibitively high costs.

Heat can be transferred from a live polymer dispersion with external cooling by removing the live polymer dispersion from the reactor or other containing vessel and circulating the dispersion through an external cooler and then feeding the thus cooled dispersion back to the reactor vessel as described in U.S. Pat. No. 2,984,657. In this way, the heat exchange area no longer depends on the size and configuration of the reaction vessel. If desired, this area may therefore be extended to permit more heat transfer. However, a major problem arises from caking in the external cooler resulting from the continued polymerization in the live dispersion during its passage through the external cooler. This caking or incrustation results in increased flow resistance to the passage of the live dispersion through the cooler and a decreased heat-exchanging capacity. Consequently, long before the cooler becomes useless it has to be discarded because the caking clogs up the external cooler. This caking problem becomes more serious the smaller the channel diameter is in the external cooler through which the live dispersion must pass. This already known process attempts to overcome the caking problem by creating conditions of laminar flow, characterized by Reynolds Numbers maximall 2000, in the external cooler outside the reaction vessel because no polymerization is said to take place in such a flow range. However, this laminar flow removes or exchanges less heat than a turbulent flow thereby significantly reducing the effectiveness of the external cooler.

The invention aims at meeting the need for a means for transferring heat from a live polymer dispersion without limitations on the amount of heat to be transferred, and without caking or incrustation problems.

The present invention makes it possible to very effectively transfer heat, independent of the reaction vessel geometry, from a live polymer dispersion using equipment occupying little space while effectively overcoming the caking problem.

BRIEF DESCRIPTION OF THE DRAWING

An embodiment of the invention is schematically illustrated in FIG. 1.

SUMMARY AND DETAILED DESCRIPTION OF THE INVENTION

Figure 1:
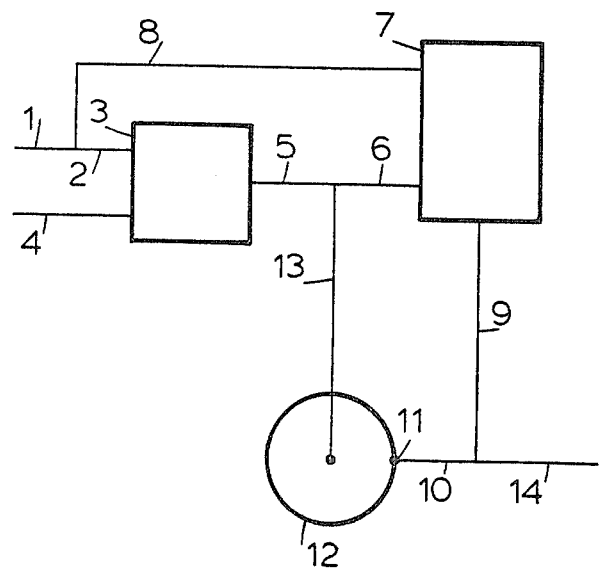

According to the present invention, heat is transferred from a fluid mixture containing a polymerizable monomer and an active polymerization catalyst, characterized in that the mixture is cooled by means of a spiral heat exchanger. In such mixtures, polymerization may occur and a polymer product will normally be present. The mixtures contain a dispersing agent, which may be identical with the polymerizable monomer. For convenience, the mixtures in question will hereinafter be referred to as 'live polymer dispersions'.

Advantageously, the process according to the present invention is employed to transfer heat from an alkene suspension-polymerization mixture containing an active catalyst. Other monomers may also be present in the mixture. While the present invention will be explained principally in view of a suspension-polymerization mixture it should be understood the present invention is not thereby limited.

Spiral heat exchangers involve two separate spiral channel systems coiled together in a heat-exchange relation with each other. The medium being cooled is passed through one channel system while the cooling medium flows countercurrently through the other channel system. Such heat exchangers are described, for instance, in the Dutch patent applications 298,649 which corresponds to U.S. Pat. Nos. 3,289,569 and 6,617,013 which corresponds to British Pat. No. 1,126,240, the disclosures of which are hereby incorporated by reference. In order to maximize the available heat exchange area relative to the channel volume both the channels have small fine diameters. These channels are narrow and susceptible to caking. Consequently, because of the caking problem, such heat exchangers have always been supposed to be particularly unsuited for cooling of live polymer dispersions. Therefore, it is very surprising that spiral heat exchangers have now been found to be applicable for the cooling of live polymer dispersions with particularly great advantage. Suprisingly it has also now been found that according to the present invention the spiral heat exchanger may operate under turbulent flow conditions.

By preference, a heat exchanger with a plane spiral is applied. Such a spiral heat exchanger is described in the British Pat. No. 1,126,240 already mentioned, and in the booklet 'Spiral Heat Exchangers' by the Alfa-Laval company (1973), which latter reference is hereby incorporated by reference.

According to a particularly advantageous embodiment of the process according to the present invention, the active catalyst particles in the live polymer dispersion are first loaded with polymer before the dispersion is fed to the spiral heat exchanger. This polymer loading may be achieved by pre-polymerization in the polymerization reactor for the required time before introduction of the suspension to the spiral heat exchanger. As soon as the active catalyst particles are loaded with sufficient quantities of polymer, the contents from the polymerization reactor may be first introduced and circulated through the spiral heat exchanger.

The required pre-polymerization time corresponds to the time needed to achieve sufficient polymer loading on the catalyst particles. The pre-polymerization takes about 5 to about 100 minutes depending on the reaction conditions employed. Preferably a pre-polymerization time of about 10 to about 50 minutes is used.

In most cases a polymer loading in the pre-polymerization of about 5 grams to about 100 grams polymer per gram of solid catalyst particles is sufficient. Preferably, polymer loading of about 10 grams to about 50 grams polymer per gram of solid catalyst particles is employed. Higher loads are possible, but do not offer any advantage.

Alternatively, in a continuous process pre-polymerization is carried out in a first reactor, a pre-polymerization reactor, without a spiral heat exchanger. The thus obtained pre-polymerized reaction mixture is fed to a second polymerization or main reactor. The pre-polymerized mixture from the first reactor may also be fed in part to the second reactor. At least a portion of the reaction mixture from the main polymerization reactor is then cooled by means of a spiral heat exchanger.

The present invention is useful with several polymerization techniques. In particular, the invention can be used with suspension polymerization systems, i.e. polymerization under such reaction conditions that the polymer obtained forms a suspension in a dispersing agent. However, the invention may also be applied in solution polymerization, i.e. polymerization under such conditions that the polymer formed dissolves in the dispersing agent. The polymerization temperature is usually between about 190 K. and 475 K. Advantageously the temperature ranges between about 310 K. and about 375 K. The pressure may range, for instance, between about 100 kPa and about 3000 kPa.

The invention finds principal application to the polymerization of alkenes. Other monomers may be present if desired. In particular, the alkenes are 2 to 10 carbon atoms 1-alkenes, such as for instance, ethylene, propylene, 1-butene or 1-hexene, or combinations thereof. Both random and block copolymerization are also possible. The invention is particularly suitable for the stereospecific polymerization of propylene, optionally in the presence of secondary amounts of ethylene. For instance a secondary amount of ethylene is not more than about 30 parts by weight ethylene. More particularly, a secondary amount of ethylene may range between about 1 and about 15% by weight of ethylene.

The process according to the invention is especially suitable for the preparation of isotactic polypropylene, random copolymers of propylene with subordinate amount of ethylene, and block copolymers of propylene and ethylene. For the preparation of block copolymers the monomers can be added in any desired order. The invention may also be applied with advantage in the polymerization of 1-butene or 4-methyl-1-pentene.

Depending on the reaction conditions chosen, any known dispersant can be applied. The dispersing agent may be an inert one or a liquid-phase monomer. Suitable dispersants include, for example, aliphatic, cyclo-aliphatic, aromatic and aliphatic-aromatic hydrocarbons with 3 to 8 carbon atom molecules such as, for example, propylene, 1-butene, butane, isobutane, n-hexane, n-heptane, cyclohexane, benzene, toluene and the xylenes.

Advantageously a Ziegler-Natta-type polymerization catalyst in employed. Such a catalyst typically contains a compound of a transition metal, usually from groups IV, V or VI of the Periodic Table. In particular the transition metal in the catalyst is vanadium and/or titanium. For the stereospecific polymerization of propylene or higher alkenes a titanium compound is almost always used.

The invention is applicable with any known variant of such a catalyst. Advantageous results are obtained especially with a $TiCl_3$ catalyst component. $TiCl_3$ can be obtained by, for instance, reducing $TiCl_4$ with aluminum metal, with hydrogen, or with an organometallic compound such as an organoaluminium compound. The transition metal component of the catalyst may contain a supporting material, e.g. silica, alumina or a magnesium halide. Besides the transition metal component, the complete polymerization component catalyst typically contains an organometallic component where the metal is from groups I, II or III of the Periodic Table, and a hydrocarbon group is directly bound to the metal. Organo-aluminum or organomagnesium compounds are examples.

A different polymerization catalyst may also be used, such as, for example, a catalyst based on chromium oxide. Any known variant of such catalysts may be used.

The polymerization may be carried out in the presence of the various known additives, such as activators, modifiers, molecular weight control agents, etcetera.

If desired, the spiral heat exchanger may also be used for heating up the reaction mixture. This may be useful in the start-up of the polymerization process.

The invention can further be illustrated by FIG. 1, which is a schematic representation of an embodiment of the present invention.

Through monomer feed lines 1 and 2, one or more polymerizable monomers, such as ethylene and/or propylene, are fed to pre-polymerization reactor 3. Optionally, polymerizable monomers may be introduced along with a suitable dispersing agent. Through catalyst feed line 4 the polymerization catalyst is added, if desired, along with a dispersant. In pre-polymerization reactor 3 the polymerization is allowed to proceed to such a degree that at the reactor outlet the catalyst particles are loaded with a sufficient quantity of polymer, such as, for example, about 5 grams to about 100 grams polymer per gram of catalyst. Through polymer dispersion feed lines 5 and 6 the live polymer dispersion is introduced into main polymerization reactor 7. The polymerizable monomer(s) is (are) also fed through lines 1 and 8 to reactor 7. Live polymer dispersion is continuously drawn off from reactor 7 through line 9. Live polymer dispersion is fed through line 10 to inlet 11 of spiral heat exchanger 12, which is the plane spiral type spiral heat exchanger described in the booklet 'Spiral Heat Exchangers' by Alfa-Laval Company (1973). The live polymer dispersion is cooled with cooling water in the heat exchanger. In the heat exchanger the dispersion flows inward through the spiral to the outlet located at the spiral center while the cooling water flows through the second spiral coil in a continuous counterflow thereby cooling the dispersion. The thus cooled dispersion flows back to reactor 7 through return lines 13 and 6. The temperature in reactor 7 is thereby constantly kept at the value desired for polymerization. Through line 14, part of the live polymer dispersion is drawn off to be processed to final polymer.

An installation for conducting polymerization reactions in which fluid mixtures containing a polymerization monomer and an active polymerization catalyst are cooled can be described as comprising the combination: a first reactor for containing the polymerization mixture fluid, the first reactor having means for introducing materials into the first reactor and also having means for feeding part of the polymerization mixture formed therein to a second polymerization reactor for further polymerization; the second reactor is equipped with a bypass circulation line containing a spiral heat exchanger; the bypass line has means for circulating a cooling media through the spiral heat exchanger countercurrently to the flow of the polymerization fluid therein; and the second reactor has means for withdrawing part of the further polymerized mixture for subsequent processing.

The invention is further illustrated in the following non-limiting examples.

EXAMPLE I

Propylene is polymerized in suspension, at 343 K. at a mean pressure of 750 kPa using a gasoline dispersing agent and a commercially available $TiCl_3.\frac{1}{3}AlCl_3$ and di-ethylaluminiumchloride catalyst in a weight ratio of 1:2. The propylene is supplied at such a rate that optimum productivity is attained. Productivity refers to the weight of polypropylene, in kg, obtained per hour and per $m^3$ of reactor volume. Adding hydrogen sets the melt index of the polymer at 10 dg/min (ISO R 1133; 503 K./21.6N).

Reaction heat is removed by circulating portions of the reactor contents along a spiral heat exchanger as described with reference to FIG. 1. The temperature of the cooling water is 288 K. At first, a productivity of 39 kg/hr.$m^3$ was attained. If the spiral heat exchanger is not applied then the initial productivity was only 24 kg/hr.$m^3$.

After some time, productivity decreases because the spiral coil through which the dispersion passes starts to clog. After ten days the spiral coil clogged to such an extent that the process had to be stopped.

Clearly, application of the spiral heat exchanger makes possible a considerable increase in productivity, but only for a limited time.

EXAMPLE II

The process according to Example I was repeated, but the spiral heat exchanger was not used until the polypropylene has been pre-polymerized to a load of 35 grams polymer per gram of solid catalyst particles. This pre-polymerization takes about 25 minutes.

After 30 days there is hardly any spiral coil clogging in the polymer heat exchanger coil since almost no polymer caking in the coil occurred. Consequently it appears to be possible to maintain a productivity of 39 kg/hr.$m^3$ for a practically unlimited time.

EXAMPLE III

Under the same reaction conditions as in Example I, a crystalline block copolymer of propylene and ethylene is prepared, with an ethylene content of 8% by weight and a melt index (503 K./21.6N) of 6. Propylene is supplied first and polymerized for about 3.5 hours. Subsequently ethylene is added and the propylene and ethylene are polymerized together in a weight ratio of about 30:70 for about 1.5 hours. In order to attain optimum productivity, the monomers are supplied at the maximum rate at which the temperature can be kept constant. The $H_2$ concentration is about 2% by volume as measured in the gas phase in the polymerization reactor.

When the spiral heat exchanger is not used the productivity is 22 kg/hr.$m^3$ but increases to 36 kg/hr.$m^3$ when it's used. After three days, the latter productivity decreases since the coil begins to clog.

EXAMPLE IV

The process according to Example III is repeated except the spiral heat exchanger is not used until the propylene has been pre-polymerized to a load of 16 grams of polymer per gram of solid catalyst particles. The pre-polymerization takes about 15 minutes.

After 30 days hardly any caking occurred in the spiral heat exchanger coil. Consequently, it appears possible to maintain a productivity of 36 kg/hr.$m^3$ for a practically unlimited time.

While the invention has been described in connection with what is presently considered to be the most practical and preferred embodiments, it is to be understood that the invention is not to be limited to the disclosed embodiments, but on the contrary is intended to cover various modifications and equivalent arrangements included within the spirit and scope of the appended claims, which scope is to be accorded the broadest interpretation.

What is claimed is:

1. Process for polymerization providing for the transfer of heat from polymerization suspensions containing at least one polymerizable monomer and an active polymerization catalyst comprising the combination of steps of:
   (a) forming a first polymerization suspension comprising at least one 1-alkene polymerizable monomer having from 2 to 10 carbon atoms and an active polymerization catalyst;
   (b) forming a second polymerization suspension by subjecting said first polymerization suspension to a pre-polymerization reaction wherein said catalyst is loaded with about 5 grams to about 100 grams of polymer per gram of solid catalyst;
   (c) subjecting said second polymerization suspension to a further polymerization reaction in a reaction zone wherein, during said further polymerization reaction, at least a portion of the polymerization suspension is withdrawn from said reaction zone;
   (d) cooling said withdrawn portion in a spiral heat exchanger; and
   (e) reintroducing the thus cooled portion of the polymerization suspension into said zone in which said further polymerization reaction takes place.

2. Process for continuous polymerization providing for the transfer of heat from polymerization suspensions containing at least one polymerizable monomer and an active polymerization catalyst comprising the steps of:
   (a) forming in a first polymerization reaction zone a polymerization suspension comprising at least one 1-alkene polymerizable monomer having from 2 to 10 carbon atoms and an active polymerization catalyst;
   (b) converting said polymerization suspension into a second polymerization suspension by subjecting said polymerization suspension to a pre-polymerization reaction wherein said catalyst is loaded with about 5 grams to about 100 grams of polymer per gram of solid catalyst;

(c) removing at least a part of the thus formed second polymerization suspension from said first polymerization reaction zone and introducing said second suspension into a second polymerization reaction zone;

(d) subjecting said second polymerization suspension to a further polymerization reaction in said second polymerization reaction zone; (e) withdrawing at least part of said second polymerization suspension from the said second polymerization zone during said further polymerization reaction;

(f) cooling the withdrawn part of said second polymerization suspension in a spiral heat exchanger; and (g) reintroducing the cooled part of said second polymerization suspension into the said second polymerization reaction zone.

3. Process according to claim 1 or 2, wherein said monomer is propylene which monomer is polymerized stereospecifically.

4. Process according to claim 1 or 2 wherein said polymerization is suspension polymerization.

5. Process according to claim 1 or 2 wherein said catalyst is a Ziegler-Natta catalyst.

6. Process according to claim 5, characterized in that $TiCl_3$ is used as a catalyst component.

7. Process according to claim 1 or 2 wherein said catalyst is based on chromium oxide.

8. Process according to claim 2 wherein said 1-alkene is ethylene, propylene, 1-butene, 4-methyl-1-pentene, 1-hexene or a combination thereof.

9. Process according to claim 2 wherein said 1-alkene is propylene and a secondary amount of ethylene.

10. Process according to claim 1 wherein said 1-alkene is ethylene, propylene, 1-butene, 4-methyl-1-pentene, 1-hexene or a combination thereof.

11. Process according to claim 1 wherein said 1-alkene is propylene and a secondary amount of ethylene.

12. Process according to claims 1, 2, 8, 9, 10 or 11 wherein said catalyst is loaded with about 10 grams to about 50 grams of polymer per gram of solid catalyst.

13. Process according to claim 1 or 2 wherein the polymerization process is conducted at temperatures between about 190° K. and about 475° K.

14. Process according to claim 1 or 2 wherein the polymerization process is conducted at temperatures between about 310° K. and about 375° K.

15. Process according to claim 1 or 2 wherein the polymerization process is at pressures conducted ranging between about 100 kPa and about 3000 kPa.

* * * * *

UNITED STATES PATENT AND TRADEMARK OFFICE
CERTIFICATE OF CORRECTION

PATENT NO. : 4,471,095

DATED : September 11, 1984

INVENTOR(S) : WILLEM J. WASSEN and JOHANNES P. SCHUREN

It is certified that error appears in the above-identified patent and that said Letters Patent is hereby corrected as shown below:

In column 5, at line 26, "$TiCl_3 \cdot 7/8\ AlCl_3$" should read --$TiCl_3 \cdot 1/3\ AlCl_3$--.

In column 8, at line 26, "at pressures conducted" should read --conducted at pressures--.

Signed and Sealed this

Second Day of April 1985

[SEAL]

Attest:

DONALD J. QUIGG

*Attesting Officer*    *Acting Commissioner of Patents and Trademarks*